Jan. 11, 1927.
F. B. ALLEN
SLUICEWAY CONSTRUCTION
Filed Oct. 30, 1925
1,613,601
2 Sheets-Sheet 1
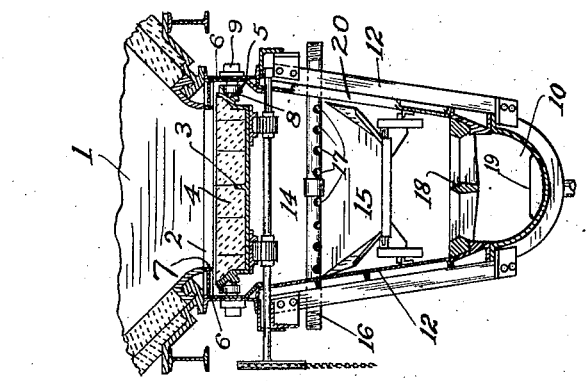
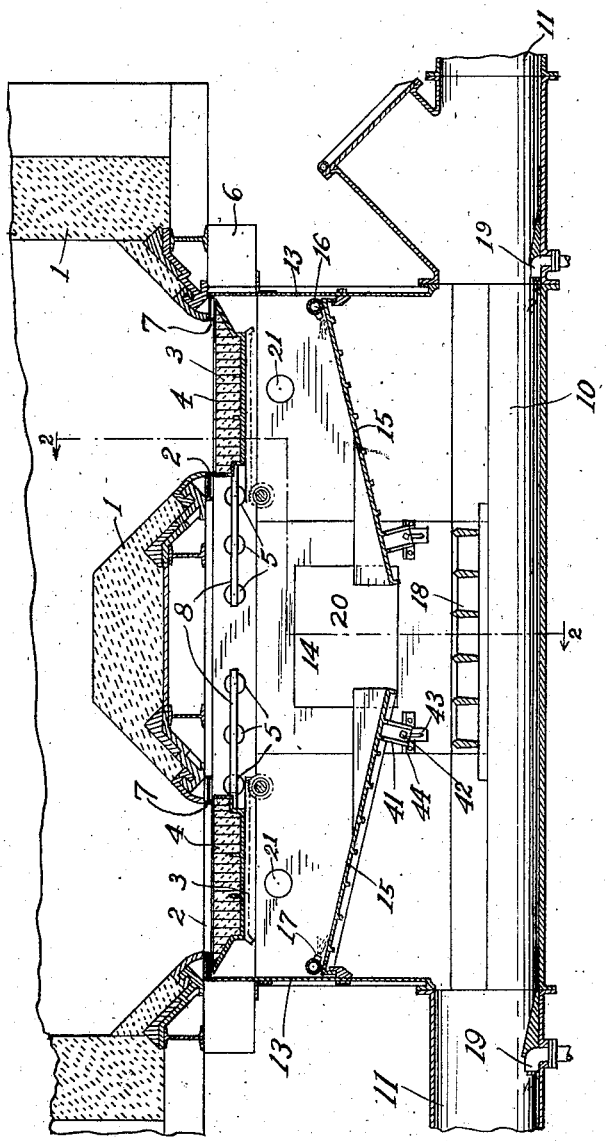
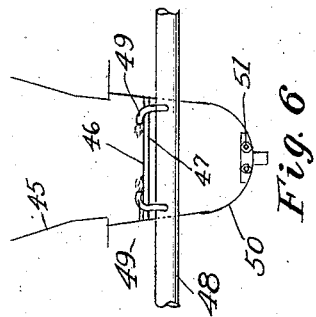
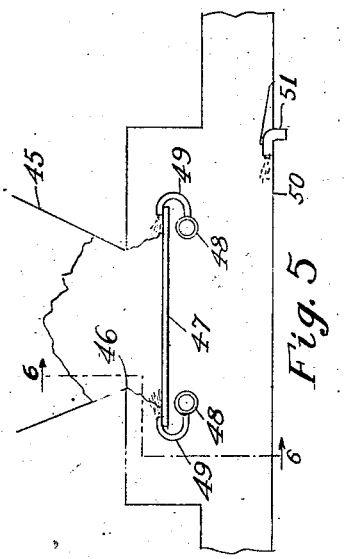
INVENTOR
Frank B. Allen
BY
Richey & Watts
ATTORNEYS Jan. 11, 1927.
F. B. ALLEN
1,613,601
SLUICEWAY CONSTRUCTION
Filed Oct. 30, 1925    2 Sheets-Sheet 2
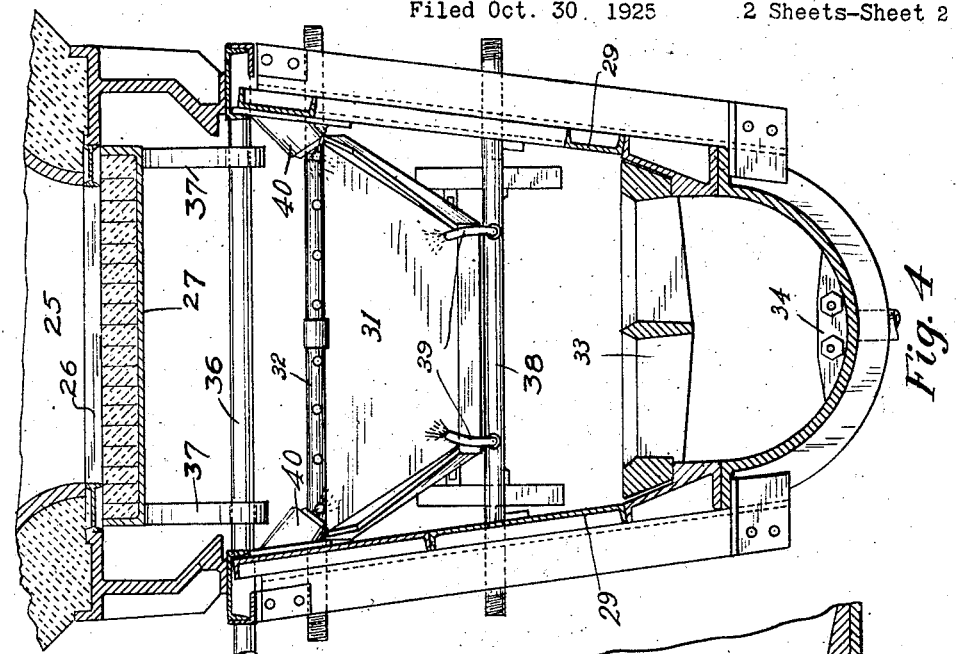
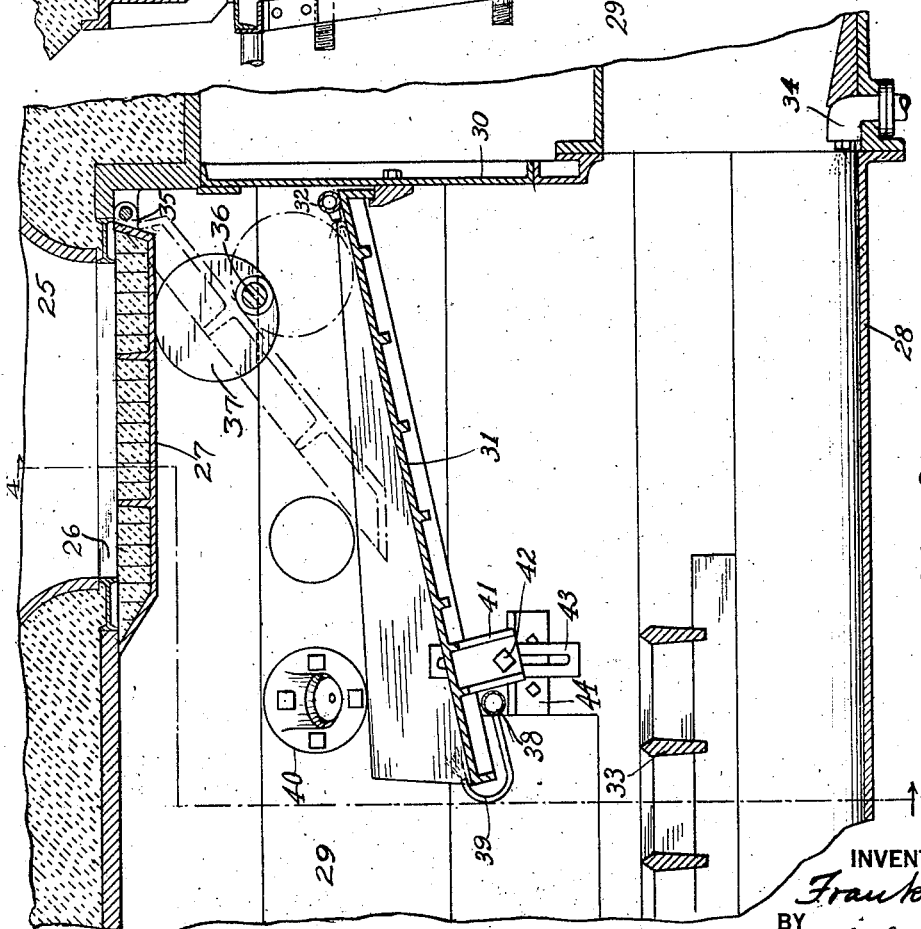
INVENTOR
Frank B Allen
BY
Richey & Watts
ATTORNEYS Patented Jan. 11, 1927.

1,613,601

UNITED STATES PATENT OFFICE.

FRANK B. ALLEN, OF LOWER MARION TOWNSHIP, MONTGOMERY COUNTY, PENNSYLVANIA, ASSIGNOR, BY MESNE ASSIGNMENTS, TO FRANK H. DUNBAR, OF CLEVELAND, OHIO.

SLUICEWAY CONSTRUCTION.

Application filed October 30, 1925. Serial No. 65,783.

This invention relates generally to hopper construction and more particularly to hoppers having apparatus associated therewith for handling solid material discharged from the hopper.

One object of my invention is to provide apparatus by which solid material discharged in large quantities from a hopper may be gradually separated according to size of pieces and the finer smaller pieces delivered to a fluid conveyor in quantities which may immediately be conveyed to a place of disposal.

Another object is to provide new and improved hydraulic means for gradually feeding an accumulation of solid material to a fluid conveyor.

Other objects will appear and be pointed out hereafter.

In the drawings which form a part of this specification:

Figs. 1 and 2 are, respectively, longitudinal and transverse sections taken through one form of apparatus embodying my invention;

Figs. 3 and 4 are, respectively, longitudinal and transverse sections taken through another form of device embodying my invention; and Figs. 5 and 6 are, respectively, diagrammatic, longitudinal and transverse views resembling Figs. 1 to 4 generally but showing another modified form of apparatus embodying my invention.

In handling materials of varying sizes, including pieces of large size, difficulty has been experienced heretofore in conveying such materials by liquid when large quantities of the material encounter the liquid.

Either the liquid must move at a relatively high velocity and with considerable force to move the large pieces and prevent clogging, or removal of the finer material may be slow or may require large amounts of liquid.

As an illustration of these difficulties, the burning of low grade powdered coal in large furnaces of the present conventional type often results in the production of considerable quantities of ash and slag which forms in a pasty or semi-liquid condition and collects on the walls of the combustion chamber where it collects quantities of the finer ash and cools, forming large masses of hard material which is removed from the furnace walls often with considerable difficulty. Hence, the solution of the problem of handling such material speedily and substantially, automatically by mechanical means, and with little or no personal supervision is of considerable importance.

By my invention, I am enabled expeditiously to handle large quantities of solid materials, including pieces of large size, by hydraulic means and have provided apparatus for so doing, which is substantially automatic in operation, which requires the attention of only one or two operators while in use, and which is of such capacity as to handle an amount of solid material within a relatively very short period of time, which for example represents the accumulation of ash in a furnace for a period of 24 hours or more.

Referring first to Figs. 1 and 2, character 1 represents fragmentary portions of the walls of combustion chamber of a powdered fuel burning furnace having discharge openings in its lower portion through which the combustible residue from combustion of fuel in the chamber may be discharged. A movable positive closure 3 is provided for each discharge opening, to retain solid materials in the hopper or combustion chamber and to prevent the flow of substantial amounts of air through the openings into the combustion chamber. The doors 3 each cooperate with a member 7 in the form of a frame surrounding the opening 2, and are guided along the sides by guide strips 8, carried by shafts 9 in girders 6 or the like on which shafts 9, rollers 5 are mounted. The doors 3 are horizontally movable and formed of cast iron lined with refractory material 4. It will be understood that when the door 3 of a discharge opening is moved into open position, all the material thereabove in the combustion chamber may pass through the discharge opening without hindrance, so far as the door is concerned. It will also be understood that any hopper may be substituted for the combustion chamber 1 without altering the arrangement or operation of the material handling apparatus embodying my invention.

I provide a sluiceway which leads to a suitable place of disposal for the solid material of the combustion chamber. Elsewhere except beneath the combustion chambers the sluiceway preferably takes the form of a round pipe 11. Beneath the combustion chambers however I provide an open topped substantially semi-circular sluiceway 10. I preferably connect the lower part with the sluiceway 10 as by side walls 12 and end walls 13 which enclose the discharge openings of the combustion chamber and the inlet opening of the sluiceway 10, and form a chamber 14 between these several openings through which the solid material may pass from the combustion chamber to the sluiceway. Within the chamber 14 and disposed beneath each discharge opening is a wall 15 upon which the large quantities of solid materials will fall when the doors 3 are opened. Across the one end of this wall or feed plate a conduit 16 extends having one or more outlets 17 through which fluid, preferably water and under pressure may be discharged along and substantially parallel to the top surface of the wall, and where water is the fluid employed, it mixes with the solid material and forms a more or less continuous stream of material flowing off the end of the wall 15. Preferably considerable pressure is imposed on the liquid discharged from this conduit 16 so that fairly large pieces of solid material will be moved thereby along the feed plate.

Beneath the lower end of one or more walls or feed plates 15 a grid 18 of the proper mesh is disposed in the path of material passing from plate 15 on its way to the sluiceway. This grid 18 serves to retain large pieces of material passing into the sluiceway 10 which are too large to be handled satisfactorily by the sluiceway or by the disposal apparatus into which the sluiceway empties.

Within the sluiceway and preferably disposed to discharge high pressure fluid, particularly water at high velocity along the bottom walls of the sluiceway, are one or more nozzles 19. A sufficient number of these nozzles are employed and fluid under sufficient pressure is passed therethrough to form a fluid conveyor on the bottom wall of the sluiceway onto which solid material passing through the grid may fall and be rapidly carried away. Various forms of nozzles may be employed but I employ the particular form of nozzle shown and described in my copending application, Serial No. 68,638 filed November 12th, 1925, and including a member having a substantially circular discharge outlet.

It will be understood by those skilled in the art that solid material discharged in bulk through the discharge opening of the hopper or combustion chamber will be received on the inclined wall or feed plate from which it will be transported in small quantities following each other in close succession and in a more or less continuous stream through the grid and thence into the sluiceway where the swiftly moving liquid conveyor will receive the same and conduct the material to a place of disposal without permitting any accumulation thereof in the sluiceway. Pieces too large to pass through the grid may either be broken up thereon or removed from the chamber through suitable doors 20 in the sides thereof and broken up outside.

Suitable apertures 21 are provided in the walls of chamber 12 through which bars or other tools may be inserted to remove slag from the walls of the combustion chamber and more completely to clean out the combustion chamber when the doors 3 are open.

It will be understood that the fluid is discharged through the conduit 16 onto the feed plate and through the nozzles 19 into the sluiceway before and during the time the doors 3 are open and also that the apparatus requires personal attention only to the extent of keeping the grid free from pieces of solid material which are too large to pass therethrough and for removing solid material which clings to the walls of the combustion chamber when the door is opened.

Referring now to Figs. 3 and 4, it will be observed that I have provided a combustion chamber or hopper 25 having discharge openings 26, a closure 27 for each discharge opening, a sluiceway 28, side and end walls 29 and 30 forming a chamber between the sluiceway 28 and combustion chamber 25, walls and feed plates 31, conduits 32, grid 33 and nozzles 34 of much the same form, construction and location as have been described in detail above and shown in Figs. 1 and 2. The modification of structure shown in these figures consists primarily in the substitution of a hinged closure 27, for the discharge opening 26, which, as shown in dotted lines in these figures, may substantially close the opening 26 as is done by the doors 3 of Figs. 1 and 2. When material is to be discharged through a discharge opening 26, closure 27 is turned about a hinge 35 at one end so that the material passes off the other end of the closure and onto the wall or feed plate 31 therebeneath. After the solid material has been removed from the combustion chamber, the closure is moved from the dotted line position into the closed position indicated by the full lines. One means for operating the closure 27 includes a shaft 36 mounted in the side walls 29 and carrying one or more eccentrics 37 or cams on which the closure rests. Rotation of the shaft 36 will raise or lower the closure.

In Figs. 3 and 4 I have also shown additional hydraulic means for washing solid material off plate 31 which includes a pipe 38 having a plurality of discharge conduits 39 for directing liquid upwardly against solid material on the plate 31. Liquid discharging through conduits 32 washes solid material from the lower or discharge end of the plate 31.

I have shown additional fluid discharge nozzles 40 similar to those disclosed and claimed in U. S. Letters Patent No. 1,496,402, issued to me on June 3rd, 1924. Water sprayed through these nozzles 40 acts to cool quickly the highly heated ash on the plate 31 and also to wash the ash off the plate.

It will be noted that plates 15 and 31 are provided with the same means at their lower ends for adjusting the inclination of the top surfaces, this means including lugs 41 on the underside of the plates having bolts 42 adjustably engaging in slotted supports 43 secured to ledges 44 on the side walls 12 and 29.

It will be understood that I may employ either of closures 27 or 3 with the remaining apparatus and may use sprinklers 40 and conduits 38 and 39 in the apparatus of Figs. 1 and 2 if desired.

In Figs. 5 and 6, in which I have shown, diagrammatically, modified structure embodying my invention, the hopper, indicated at 45, is provided with a discharge opening 46 in its lower portion through which large quantities of solid material may pass. A wall or plate 47 is disposed in position to receive large quantities of solid material passing through the hopper opening 46 and to retain the same temporarily or until they are removed therefrom by some agency. Conduits 48 are disposed adjacent to and preferably beneath the discharge ends of the plate or wall 47 and are equipped with branch conduits 49 which extend from the conduits 48 up over the wall 47, so as to direct fluid flowing through the conduits 49 against solid material on the wall and adjacent to the said discharge end thereof. Fluid, preferably water, flowing through the conduits 48 and 49 against solid material on the wall 47 will wash the solid material off the discharge end of the wall 47 in controllably small amounts, the material thereabove flowing down onto the wall 47 whence it is in turn removed by the fluid from conduits 49. A sluiceway 50, disposed in position to receive solid material moving off the discharge ends of plate 47, is provided with nozzles 51 connected to a suitable source of fluid, preferably water, under pressure so that solid material falling into the sluiceway 50, from the wall 47, may be immediately transported to a place of disposal by the same.

The foregoing detailed description is given for purposes of disclosing my invention so that others skilled in the art may practice the same and not to limit my invention to such details. The scope of my invention is limited by what is claimed.

What is claimed is—

1. In combination with a hopper having a discharge opening in its lower portion, a movable closure for said opening to retain solid material in the hopper, a chamber positioned to receive solid material discharged from the hopper through the opening, a wall in the chamber disposed in the path of material discharged through the said opening into the chamber, a grid in the chamber disposed in the path of material passing over the said wall, means for delivering liquid under pressure onto the top of the said wall, and means for delivering liquid under high pressure below the grid for carrying away solid material passing through the grid.

2. In combination with a hopper having a discharge opening in its lower portion, a movable, solid material retaining closure for said opening, a substantially horizontal sluiceway having an inlet opening in its upper portion, upstanding walls forming a chamber communicating with the hopper discharge opening and sluiceway inlet opening, a wall in the chamber disposed in the path of solid material passing through the discharge opening, a grid in the chamber disposed to receive material from the said wall, means to discharge liquid onto the top of the said wall, and means in the sluiceway to discharge liquid under pressure along the bottom of the sluiceway below the grid.

3. In combination with a hopper having a discharge opening in its lower portion, a movable, solid material retaining closure for said opening, a substantially horizontal sluiceway having an inlet opening in its upper portion, upstanding walls forming a chamber communicating with the hopper discharge opening and sluiceway inlet opening, an inclined wall in the chamber disposed in the path of solid material passing through the discharge opening, a grid in the chamber disposed to receive material from the inclined wall, means to discharge liquid onto the top of the said inclined wall, and means in the sluiceway to discharge liquid under pressure along the bottom of the sluiceway below the grid, the chamber having an opening above and adjacent to said grid.

4. In combination with a hopper having a discharge opening in its lower portion, a movable closure for the opening, a sluiceway having an inlet opening in its upper portion, walls joining the hopper and sluiceway and forming a chamber therebetween, a wall disposed in the chamber between the hopper discharge opening and the sluiceway inlet opening and adapted to receive solid material discharged through the hopper discharge opening when the closure is moved to open position, and hydraulic means operatively associated with said wall for gradually removing solid material therefrom into the sluiceway.

5. In combination with a hopper having a discharge opening in its lower portion, a movable closure for the said opening, a sluiceway having an inlet opening in its upper portion and disposed to receive solid material passing through the said discharge opening, a grid between the said discharge and inlet openings and disposed in the path of solid material passing from one opening to the other, and means for delivering material discharged from the hopper onto the grid in relatively small amounts.

6. In combination with a hopper having a discharge opening in its lower portion, a movable closure for the said opening, a sluiceway having an inlet opening in its upper portion, means to receive large quantities of solid material discharged through the said discharge opening, a grid, means for delivering such material onto the grid in relatively small amounts, and means to discharge liquid under pressure into the sluiceway to form a liquid conveyor moving at high velocity.

7. In combination with a hopper having a discharge opening in its lower portion, a movable closure for the said opening, a sluiceway having an inlet opening in its upper portion, a wall for temporarily retaining large quantities of solid material passing through the discharge opening, a grid, hydraulic means for moving the said material onto the grid in relatively small amounts, and means for forming in the sluiceway a liquid conveyor moving at high velocity for receiving and immediately carrying away the solid material passing through the said grid.

8. In combination with a hopper having a discharge opening in its lower portion, a movable closure for said opening, a sluiceway having an inlet opening in its upper portion, an inclined wall disposed in solid-material-receiving position with respect to the said discharge opening, means for discharging liquid under pressure onto the inclined wall to remove solid material therefrom, a grid disposed to receive solid material passing from the said inclined wall and to deliver the same into the said sluiceway, and high velocity fluid means in the sluiceway for conveying solid material passing through the grid.

9. In combination with a hopper having a discharge opening in its lower portion, a movable closure for the said opening, a sluiceway having an inlet opening in its upper portion, a wall for temporarily retaining large quantities of solid material passing through the discharge opening, hydraulic means at the lower end of the said wall for discharging water against solid material on the wall and removing such material in small quantities from the wall.

10. In combination with a hopper having a discharge opening in its lower portion, a movable closure for the opening, a wall disposed in the path of solid material discharged through the opening and adapted to retain temporarily relatively large quantities of solid material delivered thereto when the closure is opened, a grid disposed in the path of material discharged from the discharge end of the said wall, means at the discharge end of the wall for directing liquid against solid material on the wall adjacent to the discharge end thereof, and a sluiceway beneath the grid.

11. In combination with a hopper having a discharge opening in its lower portion, a wall disposed to receive and retain large quantities of solid material passing through the said opening, fluid means disposed adjacent to the discharge end of the said wall and adapted to move solid material off the said discharge end of the wall, a sluiceway disposed to receive material moving off the said discharge end of the said wall, and means to form in the sluiceway a fluid conveyor of high velocity for carrying away material as it falls from the said wall into the sluiceway.

12. In combination with a hopper having a discharge opening in its lower portion, a movable closure for the opening, a wall disposed in the path of solid material discharged through the said opening and adapted to retain temporarily relatively large quantities of solid material delivered thereinto when the closure is opened, means at the discharge end of the said wall for directing liquid against solid material thereon and adjacent to the discharge end thereof, and a sluiceway disposed to receive solid material removed from the said wall.

13. In combination with a hopper having a discharge opening in its lower portion, a movable closure for the said opening, a sluiceway having an inlet opening in its upper portion, walls joining the hopper and sluiceway and forming a chamber therebetween, means disposed in the chamber to receive solid material discharged through the hopper discharge opening when the closure is moved to open position, and hydraulic means operatively associated with said means for gradually removing solid material therefrom and into the said sluiceway.

14. In combination with a hopper having a discharge opening in its lower portion, a movable closure for the opening, a sluiceway having an inlet opening in its upper portion, walls joining the hopper and sluiceway and forming a chamber therebetween, an inclined wall disposed in the chamber to receive solid material discharged through the hopper discharge opening when the closure is moved to open position, and hydraulic means operatively associated with the said wall for gradually removing solid material therefrom and into the sluiceway.

In testimony whereof I hereunto affix my signature this 29th day of October, 1925.

FRANK B. ALLEN.